Figure 1:
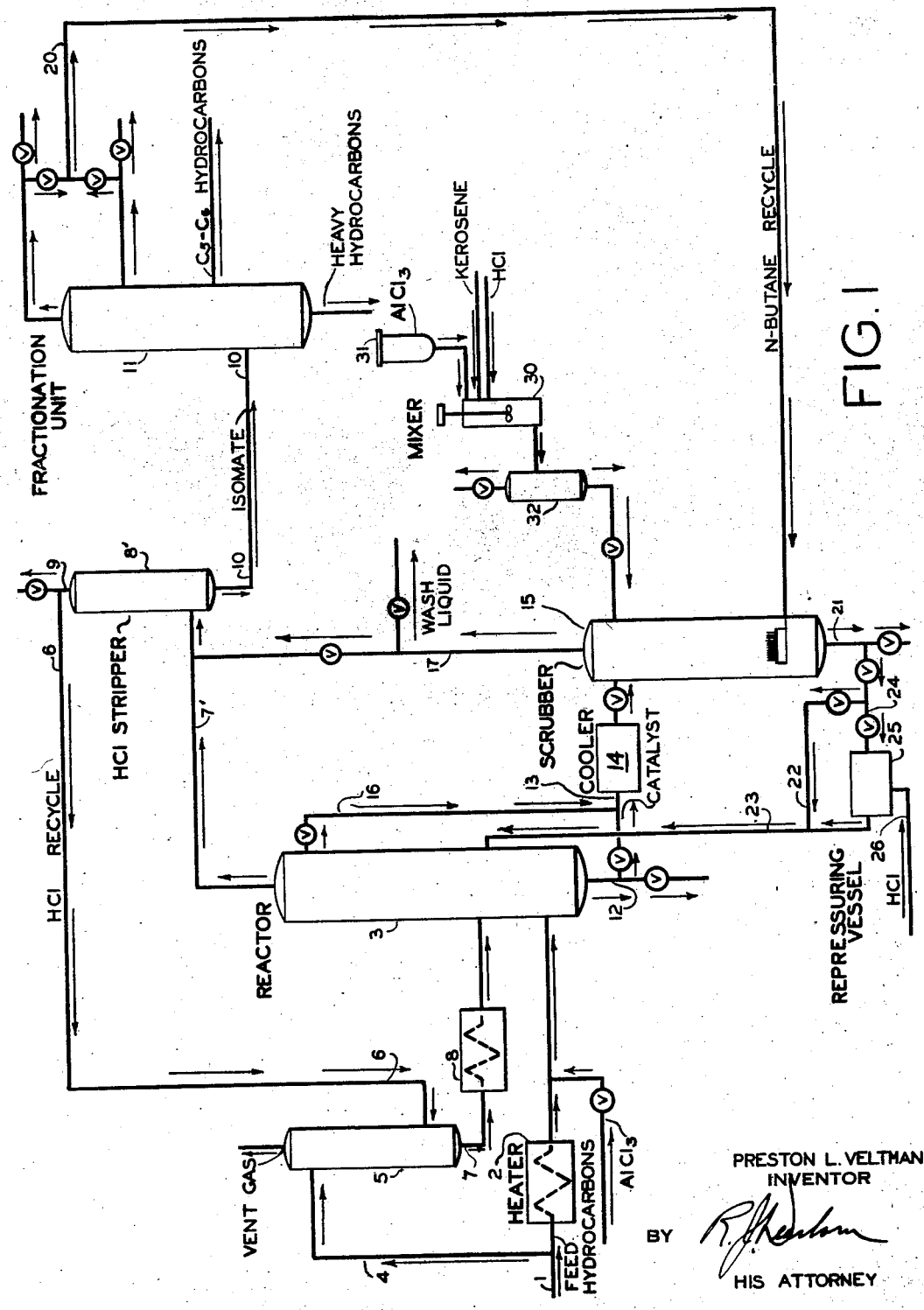

PRESTON L. VELTMAN
INVENTOR

HIS ATTORNEY

Patented Feb. 5, 1946

2,394,412

UNITED STATES PATENT OFFICE 2,394,412

CATALYTIC CONVERSION OF HYDROCARBONS

Preston L. Veltman, Port Arthur, Tex., assignor to The Texas Company, New York, N.Y., a corporation of Delaware Application May 4, 1943, Serial No. 485,604

5 Claims. (Cl. 260—683.4)

This invention relates to the catalytic conversion of hydrocarbons and more particularly by means of a metallic halide conversion catalyst.

The invention has to do with the conversion of hydrocarbons into valuable products by catalytic reactions, such as isomerization, alkylation and the like with a metallic halide hydrocarbon complex type of catalyst such as the complex compounds of aluminum halides with hydrocarbons. The catalyst may comprise preformed complex or complex formed in situ during the course of the reaction and which is catalytically active in effecting the principal conversion reaction desired, or it may comprise a mixture of preformed complex and complex formed in situ.

Specifically, the invention involves subjecting the complex catalyst to washing with a suitable solvent so as to extract therefrom hydrocarbon material or other material such as water, oxygen or oxygen compounds that may be associated with the complex and which if not removed result in substantial deterioration of the catalyst during the conversion reaction, or otherwise affect the reaction adversely.

During the course of conversion reactions such as isomerization and alkylation with liquid aluminum halide-hydrocarbon complex catalyst, inactive material of a complex nature or in the form of hydrocarbon residues may be formed through reaction between the catalyst and certain hydrocarbon constituents of the feed. Initially the products of these side reactions may be in loose combination with the catalyst and unless removed, chemically condense to form stable complex material which is catalytically inactive. Accordingly, it is desirable to extract the unstable material from the catalyst before such condensation reactions occur.

Extraneous material such as oxygen, or oxygen compounds formed within the catalyst mass through reaction with oxygen and hydrocarbons, or products of side reactions in the presence of the catalyst, may be present in the catalyst and interfere with or adversely affect the reaction to such an extent that it is extremely difficult, if not impossible to control properly the reaction.

For these reasons it is advantageous to subject the complex catalyst to washing or scrubbing in order to remove the foregoing type of material which may include complex and non-complex material which by itself is catalytically inactive, but which exerts an adverse effect or influence upon the activity of the catalyst with consequent decline in the catalyst activity. The washing treatment is also useful in removing hydrocarbons which are highly susceptible to cracking.

Aluminum halides form many different types of addition compounds with hydrocarbons depending upon the nature of the hydrocarbons and the conditions under which the reaction is brought about. The compounds so formed may be highly complex in nature.

It has been found, however, that aluminum halide-hydrocarbon complex mixtures of specified character are effective as conversion catalysts for isomerization and alkylation. Therefore, it is important to preserve the character of the complex catalyst and avoid degradation with consequent increase in catalyst consumption.

An effective catalyst for effecting isomerization reactions comprises aluminum halide-hydrocarbon complex which has a heat of hydrolysis within the range about 200 to 400, and preferably about 300 to 320 calories per gram of complex. The heat of hydrolysis is determined by mixing in a calorimeter at about normal room temperature a small and measured quantity of the complex with a quantity of water (about 3 grams of complex per gram of water) and measuring the heat evolved.

The complex is advantageously free from solids that would be separated by centrifuging at about 3000 revolutions per minute for a period of ½ hour in an A. P. I. centrifuge at about normal room temperature. Also it is characterized by having a density of about 1.35 to 1.45 grams per cubic centimeter.

A complex catalyst free from solid aluminum halide is advantageous because there is no loss of aluminum halide by migration from the complex to the stream of hydrocarbons leaving the reactor.

Such a complex may be prepared by reacting aluminum chloride with kerosene which is substantially free from aromatic and olefinic hydrocarbons. For example, about 1000 parts by weight of anhydrous aluminum chloride powder may be mixed with about 1600 parts by weight of the kerosene. To this mixture is added 50 parts by weight of hydrogen chloride. The entire mixture is subjected to agitation in a closed vessel for a period of about 4 hours at a temperature in the range 150 to about 200° F. The time of reaction may be shorter or longer depending upon the amount of hydrogen chloride employed as well as upon the temperature used.

The reaction mixture is thereafter cooled and the contents separated into phases. The complex phase is removed from the hydrocarbon phase and in accordance with the present invention is washed or otherwise treated with a suitable solvent such as propane, normal or iso butane, cyclopentane or normal pentane, carbon tetrachloride or methylene chloride, etc., at a temperature ranging from about room temperature to 220° F.

The particular solvent selected may depend upon the nature of the conversion reaction from which the complex is derived. If the objectionable material to be removed from the catalyst is formed through a combination of complex with water, carbon dioxide, or oxygen, solvents such as carbon tetrachloride or methylene chloride or other polar liquid may be used to dissolve and extract the objectionable material from the liquid catalyst. Such solvents may be used to dilute or partially disperse the complex and permit the undesired material to separate from the mixture upon standing. On the other hand if the objectionable material is formed by reaction of the complex with olefins, isoparaffins, aromatics, etc., a solvent such as a saturated hydrocarbon having up to about 4 or 5 carbon atoms per molecule may be used to wash out the objectionable molecules or fragments.

It is contemplated that removal of the objectionable molecular fragments from the complex may involve a reaction such as alkylation.

The washing may be effected in batch or in a continuous concurrent or countercurrent flow operation employing about 3 or 4 volumes of solvent liquid to 1 volume of complex.

Removal of residual kerosene from the foregoing preformed complex is advantageous where the washed complex is to be retained in storage or is to be used as a conversion catalyst in a catalytic reaction involving a temperature higher than 200° F. or higher than the temperature at which the complex is formed. Otherwise the residual kerosene if not removed may undergo decomposition in the subsequent catalytic reaction forming compounds which would enter into objectionable complex formation with aluminum halide contained in the complex.

In the isomerization of normal butane, for example, a reaction temperature ranging from 210 to 220 or 230° F. is usually maintained. Accordingly, when effecting the isomerization reaction with a preformed complex of kerosene and aluminum halide it is contemplated first washing the complex with a relatively low boiling hydrocarbon such as butane for the purpose of extracting and removing residual kerosene hydrocarbons from the complex. The washing is advantageously effected with normal butane thereby obtaining a washed preformed complex saturated with a hydrocarbon of the same character as the feed hydrocarbon to the catalytic isomerization reaction.

The presence of excess hydrocarbons in preformed kerosene complex seems to result in a decline in activity of the complex catalyst upon standing, the decline being indicated by a decrease in the heat of hydrolysis.

The amount of extract obtained by extracting a volume of preformed kerosene extract with 3 volumes of normal pentane at about room temperature may range from about 5 to 20% by volume of the complex, and the extract may contain small amounts of solid residue including oxides of aluminum, iron and titanium, etc.

The invention also contemplates continuously removing at least a portion of the used complex catalyst from the catalytic reaction zone, washing it to remove objectionable hydrocarbon or complex material that may become associated with it and thereafter recycling the washed catalyst to the reaction zone. As pointed out earlier, during the catalytic conversion reaction side reactions may occur wherein objectionable material forms or accumulates. Accordingly, by continuously withdrawing a portion of the complex catalyst from the system, washing it with a solvent and thereafter returning the washed material to the reaction zone, the entire body of complex catalyst can be maintained within the reaction zone in a high state of activity. At the same time substantial reduction in the rate of catalyst deterioration may be secured.

The continuous treatment of a stream of catalyst in the foregoing manner is applicable in a process involving isomerization of saturated feed hydrocarbons containing at least 5 carbon atoms per molecule and wherein the withdrawn complex catalyst is subjected to treatment with a lower molecular weight saturated hydrocarbon such as normal or iso butane for the purpose of displacing objectionable hydrocarbon residues and inactive complex material from the catalyst.

It has been observed that a complex catalyst of this type when used for isomerizing $C_5$ and higher molecular weight hydrocarbons may lose its activity during continued use, loss of activity being reflected by a progressive decrease in the degree of octane improvement in the converted hydrocarbons. During this continued use a decrease in the specific gravity of the complex weight from 1.5 or 1.4 to 1.3 is observed which indicates an increase in the hydrocarbon content of the complex. It is preferred to maintain the gravity of the complex at least about 1.35.

The purpose of the butane treatment, therefore, is to restore the catalyst activity, and this treatment besides effecting displacement of hydrocarbon residues or other inactive material from the complex may also involve alkylation reactions between normal or iso butane and a portion of the hydrocarbon material which has become complexed with the aluminum halide during isomerization of the higher molecular weight feed hydrocarbon. Such alkylation reactions may be promoted by the action of the small amount of residual hydrogen chloride promoter retained in the complex catalyst as withdrawn from the reaction zone.

In order to describe the invention further reference will now be made to the figures of the accompanying drawings showing flow diagrams illustrating methods of practicing the invention.

Referring to Fig. 1 a feed hydrocarbon such as normal pentane or a mixture of hydrocarbons such as a pentane-hexane fraction of straight-run naphtha is drawn from a source not shown and conducted through a pipe 1 and a heater 2 wherein it is heated to a temperature of about 180 to 210° F. The heated feed hydrocarbon is then introduced to the lower portion of a vertical reaction tower 3. The reaction tower is advantageously maintained filled with a column of liquid complex catalyst such as previously described and in a relatively quiescent or non-agitated condition.

A portion of the feed stream is advantageously diverted through a branch pipe 4 leading to the top of an absorber 5 wherein it is brought into countercurrent contact with a gaseous promoter such as hydrogen chloride entering the bottom of the absorber 5 from a pipe 6 to which reference will be made later.

The absorber may be operated at a temperature of about 100° F. and the amount of feed hydrocarbon diverted through the absorber is adjusted so as to pick up the required amount of promoter sufficient for promoting the reaction in the reactor 3. Thus, the promoter added may amount to about from 0.1 to 5% by weight of the total feed hydrocarbon. The resulting solution of feed hydrocarbon and promoter is drawn off from the bottom of the absorber 5 through a pipe 7 and a heater 8 from which the mixture is discharged to the reactor 3.

The feed hydrocarbon is introduced to the bottom portion of the reaction tower so as to bubble upwardly through a non-mechanically agitated column of catalyst liquid in the presence of promoter.

The treated hydrocarbons including isomerized hydrocarbons accumulate above the surface of the liquid catalyst at the top of the reactor 3 and are continuously withdrawn therefrom through a pipe 7' leading to a hydrogen chloride stripping tower 8'.

In the stripper 8' conditions are maintained so as to strip out of the isomerized hydrocarbon mixture hydrogen chloride contained therein. The hydrogen chloride together with a small amount of gaseous hydrocarbon material such as methane and ethane is continuously removed from the stripper through a pipe 9 and all or a portion thereof recycled through a branch pipe 6 previously designated as pipe 6.

The isomerized hydrocarbon mixture from which the hydrogen chloride has been stripped is conducted from the stripper through a pipe 10 to a fractionation unit 11 wherein the treated hydrocarbons may be separated into fractions as desired.

Referring again to the reactor 3 used catalyst of diminished activity is continuously drawn off from the bottom thereof through a pipe 12 communicating with a branch pipe 13 leading to a cooler 14 from which the used catalyst is discharged into a scrubber 15. In the cooler 14 the temperature of the withdrawn catalyst may be reduced to a temperature in the range about 70 to 150° F. or even to a lower temperature if desired.

Instead of withdrawing the used catalyst from the bottom of the tower it may be withdrawn from the upper portion of the tower through a pipe 16 which likewise communicates with the branch pipe 13.

The scrubber 15 may be a packed tower and is operated so that the used catalyst descends through the tower countercurrently to a rising body of wash solvent which in this case is normal butane.

The oily material dissolved in or mixed with the normal butane is continuously withdrawn from the top of the scrubber 15 through a pipe 17 which communicates with the previously mentioned pipe 7'. Since the catalyst drawn off from the reactor 3 will contain some hydrogen chloride, it follows that the liquid stream withdrawn from the top of the scrubber may contain substantial amounts of hydrogen chloride. Therefore, it is advantageous to pass this stream directly to the previously mentioned stripper 8' wherein the retained hydrogen chloride may be recovered for recycling to the reactor 3. The normal butane and oily material is withdrawn from the bottom of the stripper along with the isomerized hydrocarbon mixture which is passed to the fractionator 11.

Thus, in the fractionator 11 a side stream consisting essentially of normal butane may be produced and the normal butane thus recycled through a pipe 20 communicating with the previously mentioned scrubber 15.

The washed catalyst from which oily material has been removed is continuously drawn off from the bottom of the scrubber 15 through a pipe 21 and may be directed through a branch pipe 22 communicating with pipe 23 by which means the washed catalyst is recycled to the reaction tower.

If desired the washed complex catalyst may be subjected to a repressuring step wherein hydrogen chloride is injected into the complex so that the complex is saturated with hydrogen chloride under the conditions of temperature and pressure prevailing within the reactor 3 prior to introduction to the reactor. In this case the washed complex is passed through a pipe 24 to a repressuring vessel 25 to which hydrogen chloride is added from a source not shown through a pipe 26. From the vessel 25 the complex saturated with hydrogen chloride is discharged into the previously mentioned pipe 23 for return to the reactor 3.

Since a small amount of aluminum chloride is consumed during continued operation of the process it is contemplated adding a small amount of aluminum chloride continuously or intermittently to the reactor 3 so that the complex catalyst in the reactor will retain its characteristic of having a heat of hydrolysis not exceeding 300 to 400 calories per gram of complex. The make-up aluminum chloride may be added as a solution in a portion of the entering feed stream. Advantageously the aluminum chloride solution is maintained free from promoter until after introduction to the reactor. A small amount of used catalyst may be continuously or intermittently discharged from the system.

It is contemplated that the pressure prevailing in the scrubbing operation 15 may be either lower or higher than that prevailing in the reactor 3. For example, when isomerizing higher molecular weight hydrocarbons such as pentane, hexane, etc., the pressure prevailing in the reactor 3 may be relatively low. Consequently the pressure prevailing in the scrubber 15 may be substantially higher than that prevailing in the reactor 3 in order to maintain the butane in a liquefied condition. If a higher pressure prevails in the scrubber 15 it may be desirable to pass the effluent butane mixture to a separate fractionating unit.

While the scrubbing treatment as desired above is effected without the addition of any promoter beyond that already present in the complex catalyst as withdrawn from the reactor 3, nevertheless it is within the scope of the invention to effect the normal butane treatment in the presence of a small amount of added promoter if desired. Thus, the normal butane treatment may actually be carried out under conditions such that isomerization of normal butane occurs. It has been found that subjecting the complex to contact with normal butane under isomerizing conditions results in restoration of its activity for isomerizing higher molecular weight hydrocarbons.

It is also contemplated that the process described in Fig. 1 may be applied to the isomerization of normal butane, the used complex withdrawn from the reactor likewise being subjected to a washing treatment with normal butane or with some other solvent or diluent such as liquid propane.

When it is desired to utilize a batch of preformed complex, such complex may be prepared in a mixer 30 wherein kerosene or a kerosene fraction is reacted in the presence of HCl with aluminum chloride conducted from a storage hopper 31. The resulting complex is passed to a vent chamber 32 and from there to the previously mentioned scrubber 15.

Figure 2:
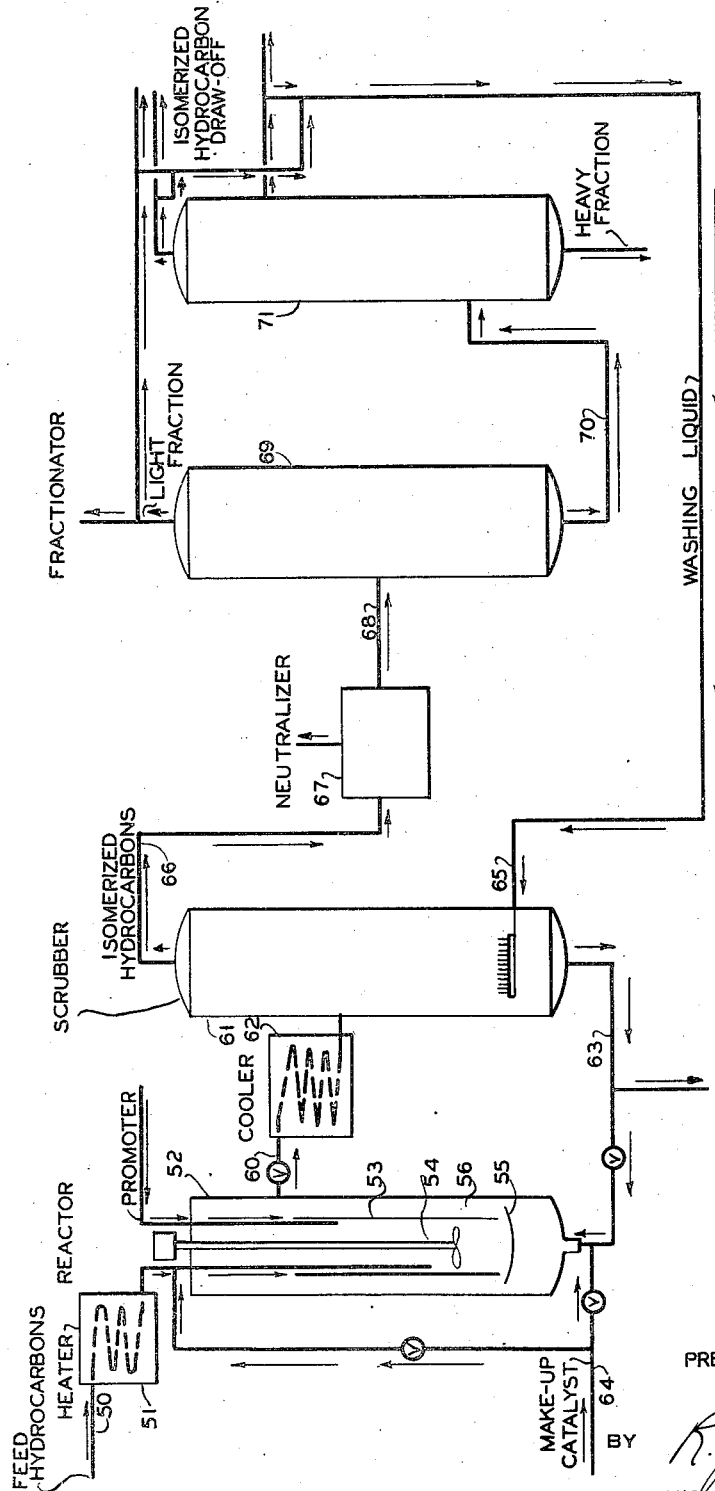

Fig. 2 illustrates a method of flow which may be useful in carrying out either an alkylation reaction or an isomerization reaction although it will be described with reference to isomerization specifically.

The feed hydrocarbon is introduced through a pipe 50 and passed through a heater 51 wherein it is raised to the reaction temperature. The hot feed mixture is then introduced to a reactor 52 which is of the agitator type. As indicated it is provided with an interior cylindrical section 53 having a propeller 54 by which means the liquid contents of the vessel 52 are forced downwardly through the cylinder 53 against a baffle 55. The baffle 55 deflects the mixture outwardly into the annular space 56 through which the reaction mixture flows upwardly. In this way the catalyst and hydrocarbons undergoing conversion are subjected to intimate mixing.

A portion of the reaction mixture is continuously drawn off through a pipe 60 to a scrubber 61 and may, if desired, be cooled during passage through a cooler 62 to a temperature of about 70 to 150° F.

The cooled mixture is introduced to the intermediate portion of the vessel 61, which vessel is advantageously of substantial height to permit settling. The catalyst separates as a catalyst phase in the bottom portion of the vessel 61 while the hydrocarbons collect as a hydrocarbon phase in the upper portion.

The catalyst phase is continuously drawn off from the bottom of the vessel 61 through a pipe 63 by which means it is returned to the bottom of the reactor 52 for further use as a catalyst. As indicated, make-up catalyst may be injected from a pipe 64 into the recycling stream of catalyst. On the other hand the make-up catalyst may be injected in the entering hydrocarbon feed stream.

As indicated the body of catalyst phase accumulating in the bottom of the vessel 61 is subjected to continuous scrubbing with a wash liquid introduced to the bottom of the scrubber through a pipe 65 at a temperature of about 70 to 150° F.

The wash liquid may be a low boiling paraffin hydrocarbon such as normal or iso butane or a solvent such as methylene chloride, and is introduced in substantial amount, for example, in the proportion of about 3 or 4 volumes of wash liquid per volume of catalyst phase. In this way the tarry material and other impurities associated with the complex are continuously washed and extracted therefrom.

The wash liquid containing dissolved impurities rises to the upper portion of the vessel 61 and is removed therefrom together with the reacted hydrocarbons through the pipe 66.

The mixture flowing through the pipe 66 may be passed to a neutralizing unit 67 for the purpose of removing any entrained promoter. From there the mixture flows through a pipe 68 to a fractionator 69 wherein a light fraction is removed. The bottoms from the fractionator 69 are then conducted through a pipe 70 to a fractionator 71 for separation into additional fractions. Thus, the fraction removed from the top of the fractionator 71 may comprise isomerized hydrocarbons.

The hydrocarbon used as a washing liquid and depending upon its boiling range may be removed as an independent fraction from the proper point in the fractionation system and returned to the scrubber through the previously mentioned pipe 65.

When the process is used for alkylation as, for example, the alkylation of isobutane with a low boiling olefin, such as ethylene or propylene, it will, of course, be understood that the feed mixture entering the system through the pipe 50 will contain the isoparaffin and olefin constituents of the feed in the proper proportion, which means that the isoparaffin is usually in substantial molecular excess over the olefin.

The appropriate temperature conditions will be maintained in the reaction vessel which in the case of an alkylation reaction is relatively lower than prevails for isomerization.

While single reaction vessels or towers have been indicated in both figures of the drawings, it is, of course, contemplated that a plurality of reaction vessels may be employed permitting the reaction to be carried out in stages.

Mention has been specifically made of employing aluminum halides. However, it is contemplated that the catalyst may be a complex of other metallic halides selected from the halides of the metals of groups 2, 3, 4, 5 and 8 of the periodic system. Suitable promoters include hydrogen chloride and hydrogen bromide.

Also the complex may be prepared initially by reacting the metallic halide with relatively low boiling hydrocarbons other than kerosene, although saturated aliphatic hydrocarbons in the boiling range of gasoline and kerosene are preferred. In a continuous process, a small amount of metallic halide is continuously or substantially continuously added to the reaction zone, a small amount of used complex being withdrawn. The added metallic halide apparently enters into complex formation with a portion of the entering feed hydrocarbon or with hydrocarbon fragments thereof, so that after a time the effective catalyst may consist entirely of complex formed in situ. It is within the scope of this invention to subject this complex formed in situ to continuous washing or other treatment to remove catalytically inactive components formed as a result of side reactions.

Thus the effective complex may be a complex of the metallic halide with a normally gaseous or a normally liquid hydrocarbon boiling below about 450 to 500° F.

Obviously many modifications and variations of the invention, as hereinbefore set forth, may be made without departing from the spirit and scope thereof and, therefore, only such limitations should be imposed as are indicated in the appended claims.

I claim:

1. In a process for effecting conversion of hydrocarbons involving reactions such as alkylation and isomerization by contact with an aluminum halide hydrocarbon complex, the steps comprising continuously passing a stream of feed hydrocarbons to a reaction zone, subjecting said hydrocarbons therein to contact with liquid aluminum halide-hydrocarbon complex catalyst in the presence of hydrogen halide promoter under predetermined conditions of pressure and elevated temperature such that substantial conversion is effected, continuously withdrawing reacted hydrocarbons containing some promoter from the reaction zone, passing withdrawn reacted hydrocarbons to a stripping zone, withdrawing used complex contaminated with inactive material formed during said conversion and containing some promoter from the reaction zone to a scrubbing tower, passing the withdrawn complex at a temperature of about 70 to 150° F. and in the absence of added promoter downwardly through the tower countercurrently to and in intimate contact with a rising body of wash solvent liquid introduced to the lower portion of the tower from an external source, displacing inactive material and promoter from said complex in the tower, withdrawing scrubbed complex from the lower portion of said tower, recycling withdrawn scrubbed complex to the reaction zone, withdrawing from the upper portion of the tower wash solvent mixed with inactive material and promoter removed from the complex, passing withdrawn mixture of solvent, inactive material and promoter to the aforesaid stripping zone, effecting removal therein of promoter from said mixture to produce a stripped mixture of hydrocarbons and solvent, recycling removed promoter to said reaction zone, removing solvent from resulting stripped mixture, and recycling removed solvent to said scrubbing tower.

2. The method according to claim 1 in which the wash solvent is a saturated aliphatic hydrocarbon having from 3 to 5 carbon atoms per molecule.

3. The method according to claim 1 in which the scrubbed complex is saturated with hydrogen halide promoter under said predetermined conditions of temperature and pressure prior to return to the reaction zone.

4. A continuous method of isomerizing normal butane which comprises passing a stream of normal butane to a reaction zone, subjecting normal butane therein while in liquid phase to contact with liquid aluminum halide-hydrocarbon complex catalyst in the presence of hydrogen halide promoter under predetermined conditions of pressure and elevated temperature in the range of about 180 to 230° F. such that substantial isomerization of normal butane is effected, continuously withdrawing a stream of isomate hydrocarbons containing promoter from the reaction zone, passing said stream of isomate to a stripping zone, separately withdrawing from the reaction zone used complex contaminated with inactive material formed during said isomerization and containing promoter, passing withdrawn complex to the upper portion of a scrubbing tower, introducing to the lower portion of the scrubbing tower a stream of normal butane in liquid phase and substantially free from promoter, causing the normal butane to rise through the descending complex in the scrubbing tower at a temperature in the range about 70 to 150° F., removing from the top of the scrubbing tower a stream of normal butane containing promoter and material removed from the complex, passing said removed normal butane stream to the aforesaid stripping zone, subjecting the removed normal butane stream and the aforesaid isomate stream to stripping in the presence of each other in said stripping zone to remove promoter and produce a stripped hydrocarbon mixture, thereafter subjecting resulting stripped hydrocarbon mixture to fractionation in a fractionating zone, separately discharging isobutane and normal butane from the fractionating zone, recycling discharged normal butane in part to said scrubbing tower to provide the normal butane feed thereto, removing from the bottom portion of the scrubbing tower scrubbed complex, and recycling scrubbed complex to the reaction zone.

5. The method according to claim 4 in which the scrubbed complex is saturated with hydrogen halide promoter under said predetermined conditions of temperature and pressure prior to return to the reaction zone.

PRESTON L. VELTMAN.